United States Patent [19]
Stull et al.

[11] Patent Number: 5,566,975
[45] Date of Patent: Oct. 22, 1996

[54] CONTROLLED PRESSURE RELIEF OF AN INFLATABLE RESTRAINT REACTION CANISTER

[75] Inventors: Mark W. Stull, Layton; Michael J. Ravenberg, Corinne; Donald R. Lauritzen, Hyrum; Larry D. Rose, Layton; David J. Green, Brigham, all of Utah

[73] Assignee: Morton International, Inc., Chicago, Ill.

[21] Appl. No.: 419,302

[22] Filed: Apr. 10, 1995

Related U.S. Application Data

[63] Continuation-in-part of Ser. No. 46,692, Apr. 12, 1993, Pat. No. 5,407,227, and Ser. No. 43,960, Apr. 13, 1993, Pat. No. 5,407,226, which is a continuation-in-part of Ser. No. 840,238, Feb. 24, 1992, Pat. No. 5,332,256, said Ser. No. 46,692, is a continuation-in-part of Ser. No. 840,238.

[51] Int. Cl.$^6$ ................................................. B60R 21/16
[52] U.S. Cl. .............................................. 280/732; 280/739
[58] Field of Search ............................ 280/737, 741, 280/732, 728.1, 739; 220/89.1, 89.2

[56] References Cited

U.S. PATENT DOCUMENTS

| | | | |
|---|---|---|---|
| 3,204,156 | 8/1965 | Moresi et al. | 317/230 |
| 3,414,292 | 12/1968 | Oldberg et al. | 280/740 |
| 3,680,886 | 8/1972 | Mazelsky | 280/150 |
| 3,708,181 | 1/1973 | Mazelsky | 280/150 |
| 3,715,131 | 2/1973 | Hurley et al. | 280/736 |
| 3,778,083 | 12/1973 | Hamasaki | 280/739 |
| 3,880,447 | 4/1975 | Thorn et al. | 280/740 |
| 3,938,826 | 2/1976 | Giorgini et al. | 280/738 |
| 4,111,457 | 9/1978 | Kob et al. | 280/728 |
| 4,136,894 | 1/1979 | Ono et al. | 280/740 |
| 4,332,398 | 6/1982 | Smith | 280/732 |
| 4,513,873 | 4/1985 | Klaschka | 220/89 |
| 4,547,342 | 10/1985 | Adams et al. | 422/166 |
| 4,561,675 | 12/1985 | Adams et al. | 280/734 |
| 4,817,828 | 4/1989 | Goetz | 222/3 |
| 4,842,300 | 6/1989 | Ziomek et al. | 280/732 |
| 4,877,264 | 10/1989 | Cuevas | 280/731 |
| 4,915,410 | 4/1990 | Bachelder | 280/728 |
| 4,941,678 | 7/1990 | Lauritzen et al. | 280/732 |
| 4,949,862 | 8/1990 | Barbaritz et al. | 220/89.1 |
| 4,964,654 | 10/1990 | Bishop et al. | 280/728 |
| 4,986,569 | 1/1991 | Bruton | 280/743 |
| 5,058,919 | 10/1991 | Paquette et al. | 280/732 |
| 5,069,480 | 12/1991 | Good | 280/743 |
| 5,072,967 | 12/1991 | Batchelder et al. | 280/732 |
| 5,121,941 | 6/1992 | Mihm et al. | 280/728 |
| 5,128,674 | 7/1992 | Levosinski | 220/728 |
| 5,195,775 | 3/1993 | Komerska et al. | 280/728 |
| 5,197,622 | 3/1993 | Anderson | 220/89.2 |

(List continued on next page.)

FOREIGN PATENT DOCUMENTS

| | | | |
|---|---|---|---|
| 0447030 | 9/1991 | European Pat. Off. | 280/728 |
| 0496267 | 7/1992 | European Pat. Off. | |
| 0529304 | 3/1993 | European Pat. Off. | |
| 2151938 | 4/1973 | France. | |
| 2022194 | 12/1979 | United Kingdom | 280/740 |

OTHER PUBLICATIONS

The American Heritage Dictionary, published by Houghton Mifflin Co., p. 223.

*Primary Examiner*—Paul N. Dickson
*Attorney, Agent, or Firm*—Nick C. Kottis; Gerald K. White

[57] ABSTRACT

Featured for use as a part of a reaction canister of an inflatable restraint system is a conventionally extruded one-piece canister structure body part having first and second opposite side walls and a bridging portion joining the first and second opposite side walls. In the body part, at least one of the bridging portion, first side wall and second side wall includes a tear seam adapted to tear under the influence of a build-up of pressure thereagainst to provide venting of such pressure. As a result of alleviating concerns such as of material fragmentation when exposed to extreme heat conditions, e.g., a fire, the invention allows the more widespread use of light weight, temperature sensitive materials in reaction canister constructions.

18 Claims, 5 Drawing Sheets

U.S. PATENT DOCUMENTS

| | | | |
|---|---|---|---|
| 5,209,519 | 5/1993 | Shiga et al. | 280/728 |
| 5,259,643 | 11/1993 | Kraft et al. | 280/740 |
| 5,261,693 | 11/1993 | Krickl et al. | 280/733 |
| 5,263,739 | 11/1993 | Webber et al. | 280/732 |
| 5,280,948 | 1/1994 | Henseler et al. | 280/728 |
| 5,284,358 | 2/1994 | Rhein | 280/728 |
| 5,346,251 | 9/1994 | Burnard et al. | 280/737 |
| 5,407,226 | 4/1995 | Lauritzen et al. | 280/732 |
| 5,407,227 | 4/1995 | Lauritzen et al. | 280/732 |
| 5,431,436 | 7/1995 | Mossi et al. | 280/728.1 |

CONTROLLED PRESSURE RELIEF OF AN INFLATABLE RESTRAINT REACTION CANISTER

CROSS REFERENCE TO RELATED APPLICATIONS

This application is a continuation-in-part application of: a) U.S. Ser. No. 08/046,692, filed on Apr. 12, 1993, now U.S. Pat. No. 5,407,227; and b) U.S. Ser. No. 08/043,960, filed on Apr. 13, 1993, now U.S. Pat. No. 5,407,226; and which both parent applications are in turn continuation-in-part applications of application, U.S. Ser. No. 07/840,238, filed on Feb. 24, 1992, now U.S. Pat. No. 5,332,256. The parent patent applications are hereby incorporated by reference herein and are made a part hereof, including but not limited to those portions which specifically appear hereinafter.

BACKGROUND OF THE INVENTION

This invention relates generally to inflatable passive restraint systems for use in vehicles for restraining the movement of a seated occupant during a collision and, more particularly, to an improvement in the structure for housing and positioning a gas generator and an inflatable bag in the vehicle.

Safety restraint systems which self-actuate from an undeployed to a deployed state without the need for intervention by the operator, i.e., "passive restraint systems" and particularly those restraint systems incorporating inflatable bags or cushions, as well as the use of such systems in motor vehicles have been the subjects of much discussion as the desirability of the use of such passive restraint systems has gained general acceptance.

In general, air bag module assemblies of the prior art generally include three basic components: 1) a cushion or air bag that is inflated with gas such as when the vehicle encounters a sudden deceleration, 2) an inflator which upon actuation serves to provide the gas used to inflate the air bag, and 3) a reaction canister which typically functions as a structural housing supporting both the inflator and the air bag while providing a mounting base for installation of the assembly in a vehicle and direction to the inflation gases resulting from the inflator.

It is well known to protect a vehicle occupant using a cushion or bag that is inflated with gas, e.g., an "inflatable bag" or, commonly referred to as an "air bag", when the vehicle encounters sudden deceleration, such as in a collision. During deployment, the gas with which the bag is typically filled is an inert gas, e.g., nitrogen. In such systems, the inflatable bag is normally housed in an uninflated and folded condition to minimize space requirements. Upon actuation of the restraint system, gas is discharged from an inflator to rapidly inflate the bag. The bag can then serve to restrain the movement of the vehicle occupant as the collision proceeds.

Vehicular inflatable restraint systems generally include multiple crash sensors generally positioned about or mounted to the frame and/or body of the subject vehicle and serve to sense sudden decelerations by the vehicle. In turn, the sensor sends a signal to an inflatable bag module/assembly strategically positioned within the riding compartment of the vehicle to actuate deployment of the air bag. In general, an inflatable bag provided for the protection of a vehicle driver, i.e., a driver side air bag, is mounted in a storage compartment located in the steering column of the vehicle. Whereas, an inflatable bag for the protection of a front seat passenger, i.e., a passenger side air bag, is typically mounted in the instrument panel/dash board of the vehicle.

Typical inflatable passive restraint systems make use of an air bag module which generally includes an outer reaction housing or canister, commonly referred to as a "reaction can" or, more briefly, as a "can". The reaction canister generally serves to support or contain other components of the air bag module system, including what is referred to as a "air bag inflator" or, more briefly, as an "inflator", or, alternatively, as a "generator". The inflator, upon actuation, acts to provide the gas to inflate the bag.

In the past, typical pyrotechnic air bag inflators comprised a steel housing having walls of a thickness related to the gas production characteristics of the pyrotechnic material housed therein, with the walls of conventional inflators required to be relatively thick to contain the maximum gas pressure exhibited under high ambient temperature conditions.

Emphasis on weight reduction in automobiles, however, has created a need, and a demand, for a lighter weight passenger side inflatable passive restraint system. A most significant reduction in the weight of the system can be achieved through the utilization of a low weight material such as aluminum or an aluminum alloy rather than a heavy steel material, as used in previous structures, for inflatable restraint system inflator structures.

The use of aluminum for air bag inflators is disclosed, for example, in commonly assigned U.S. Pat. No. 4,547,342, issued Oct. 15, 1985 to Adams et al., and U.S. Pat. No. 4,561,675, issued Dec. 31, 1985 to Adams et al.

U.S. Pat. No. 5,346,251 discloses the inclusion of a V-shaped arcuate stress concentration groove along a wall of an inflator to result in structural failure of the air bag inflator pressure vessel in the event of over pressurization.

However, because of the relatively high pressures generated in conventional inflators, e.g., pyrotechnic inflators commonly produce pressures in the range of about 1500–3000 psi, the walls of such inflators are typically fabricated of relatively thick material to provide additional strength thereto.

In addition, in conventional air bag module assemblies, the inflator is typically housed within a walled reaction canister. This housing structure provides protection for the gas generator and the inflatable bag until the time of deployment of the latter and also acts to absorb the loads generated by the deployment of the bag. Typically, these loads are large and unless sufficiently absorbed can cause damage to the vehicle including, in the case of a passenger side assembly, damage to the dash panel. Thus, it has been a practice in the prior art to use heavyweight structures, particularly steel structures, for housing and positioning an inflator, particularly an inflator for a passenger side assembly, in order to prevent or minimize such damage. As will be appreciated, the use of a thick walled inflator housed within a walled reaction housing typically results in an assembly of greater weight than is optimally desired.

However, commonly assigned U.S. Pat. No. 4,941,678, Lauritzen et al., issued Jul. 17, 1990, discloses a lightweight housing canister assembly having a design avoiding such bell mouthing deformation. The assembly includes a body part, such as made of by continuous aluminum extrusion. The assembly further includes a tether strap, at the mouth inside the bag. The tether strap serves to: 1) restrict the loading of the reaction canister that is positioned transversely thereto and 2) retain the spreading forces at the mouth of the canister upon bag deployment. This allows the use of a lighter section at the mouth of the canister and eliminates the need for reinforcing flanges along the sides of the canister, which flanges would undesirably increase the weight of the assembly. The structural arrangement of the Lauritzen et al. patent, however, complicates the manufacturing and assembling operations, and moreover, does not allow installation of the inflator as a last operation in the assembly of the module.

Air bag assembly structures fabricated of such light weight materials typically will not experience problems in ordinary use wherein, during the event of a collision, the ignition agent is ignited, followed by the igniting of the gas generant to generate inflation gas. However, the mechanical strength of such lighter weight materials is lowered when overheated to a high temperature, such as when subjected to a high temperature environment, such as a bonfire. This problem stems from the fact that at a temperature in excess of about 300° F. (149° C.), the pyrotechnics of pyrotechnic-containing gas generators commonly automatically ignite. In this temperature range, the aluminum of the housing structure degrades and tends to rupture or burst, which in turn can result in the projection of pieces and/or fragments in various directions. This problem is typically not encountered with structures that employ steel since steel does not degrade until a much higher temperature of about 1100° F. (593° C.) is reached. Thus, the use of aluminum, in place of steel, while serving to reduce the weight of the assembly typically results in a structure having a lower internal pressure capability. This lower internal pressure capability could be hazardous in a high temperature environment such as a reaction canister structure in a module assembly might be subjected to in the event of a fire whether in storage, in transit, or after installation in a vehicle.

Thus, there is a need and a demand for inflatable restraint system structures, specifically a reaction canister structure, which provides for the safe release of energy therefrom, such as produced by an inflator housed therein when exposed to extreme heat conditions, e.g., a fire, without forming or projecting metal fragments into the vehicle interior.

In addition, inflatable passive restraint systems are commonly installed in vehicles of a variety of different sizes and shapes. Further, there are a variety of different types of inflators such as pyrotechnic, stored gas or hybrid inflators, for example and which inflators can take a variety of shapes and/or sizes as the inflators are specifically designed for particular applications.

As a result, there is a need for a reaction canister structure having applicability in a wide variety of applications and in which an inflator selected from a wide variety of inflator devices can be utilized. That is, there is a need for a reaction canister structure that is capable of a more widespread or universal utilization and applicability.

Further, as reaction canisters are commonly fabricated using formed and/or welded steel, such fabrication techniques are not conducive to the economical and effective incorporation therein of various desired features, such as various mounting or attachment preparations, for example, in particular vehicular inflatable restraint system design applications. Thus, there is a need and a demand for an improved structural arrangement which is conducive to the economical and effective incorporation of various such desired features for particular vehicular inflatable restraint system design applications.

Still further, an increasing emphasis on weight reduction in automobiles has created a need and a demand for an improved structural arrangement which permits the more widespread usage of lighter weight assemblies.

Yet still further, there is a need and a demand for a light weight air bag module assembly structural arrangement which is not subject to undesired fragmentation when subjected to extreme temperature conditions, such as a bonfire.

Thus, there is a need and a demand for an improved reaction canister for use in an air bag module, particularly for the passenger side of a vehicle. In particular, there is a need and a demand for an air bag reaction canister construction which facilitates and permits the greater use of light weight, temperature sensitive materials, such as of aluminum and various aluminum alloys, where previously only heavier, relatively temperature insensitive materials, such as steel, could be used due to concerns such as of material fragmentation when exposed to extreme heat conditions, such as from a fire.

SUMMARY OF THE INVENTION

A general object of the invention is to provide an improved structure for use in housing and positioning an inflator and inflatable bag in an inflatable passive restraint system.

A more specific objective of the invention is to overcome one or more of the problems described above.

Another object of the invention is to provide a structure embodying such improvements, specifically, a simple reaction canister assembly structure which provides for the safe release of energy therefrom, such as produced by an inflator housed therein when exposed to extreme heat conditions, e.g., a fire, without forming or projecting metal fragments into the vehicle interior and while meeting the high reliability standards and requirements associated with and prerequisite for use in such safety devices and systems and which at the same time can be manufactured in relatively high production rates and at relatively low cost.

The general object of the invention can be attained, at least in part, through a specifically shaped and/or formed conventionally extruded one-piece body part. The body part includes first and second opposite side walls and a bridging portion joining said first and second opposite side walls. At least one of the bridging portion, first side wall and second side wall includes a tear seam adapted to tear under the influence of a build-up of pressure thereagainst to provide venting of such pressure.

The prior art fails to allow or permit the widespread use of light weight, temperature sensitive materials, such as aluminum and various aluminum alloys, where previously only heavier, relatively temperature insensitive materials, such as steel, could be used due to concerns such as of material fragmentation when exposed to extreme heat conditions, such as from a fire.

The invention also provides such a conventionally extruded one-piece canister structure body part wherein the bridging portion includes a linear tear seam incorporated in the body part during the extrusion fabrication thereof. The tear seam is adapted to tear under the influence of a build-up of pressure thereagainst of no more than about 100 psi to provide venting of such pressure.

Other objects and advantages will be apparent to those skilled in the art from the following detailed description taken in conjunction with the appended claims and drawings.

As used herein, references to "extrusion" and "conventional extrusion" are to be understood to delineate from impact processing. Specifically, extrusion generally refers to a fundamental processing operation in many industries in which a material is forced through a metal forming die, followed by cooling or chemical hardening. In contrast, in impact processing, a part is formed in a confining die from a metal slug, usually cold, by a single stroke application of force through a punch causing the metal to flow around the punch. While impacts are suited for the making of hollow parts that have one end totally closed, an extrusion rather than an impact is better suited for the formation of a tubular outside wall with open ends, such as described later herein.

The phrase "thrust neutral" refers to the production by an inflator of zero thrust when initiated as, for example, during a deployment event or accidentally such as during shipping, storage, or handling thereof. That is to say, the gas discharge openings in the inflator are so positioned that the gas is discharged in opposing directions whereby there are no resulting forces tending to cause physical movement of the inflator. Hence, the inflator will expend the energy generated thereby, generally in place.

BRIEF DESCRIPTION OF THE DRAWINGS

A detailed description of the invention follows with reference to the accompanying drawings, for which.

DETAILED DESCRIPTION OF THE INVENTION

The present invention, as is described in more detail below, provides an improved reaction canister body part for use in inflatable passive restraint systems for use in vehicles for restraining the movement of a seated occupant during a collision.

While the invention is described hereinafter with particular reference to a passenger side air bag module assembly for automotive vehicles including vans, pick-up trucks, and particularly automobiles, it is to be understood that the invention also has applicability not only with other types or kinds of vehicles including, for example, airplanes, but also can, if desired, be used with other types or kinds of air bag module assemblies for automotive vehicles including, for example, driver side assemblies. With respect to automotive vehicles it will also be appreciated that due to usual physical differences between passenger and driver side air bag module assemblies, including the typical difference in size with passenger side air bags generally being much larger than those used in driver side assemblies, the invention is perceived to have particular initial utility in passenger side air bag module assemblies.

Figure 1:
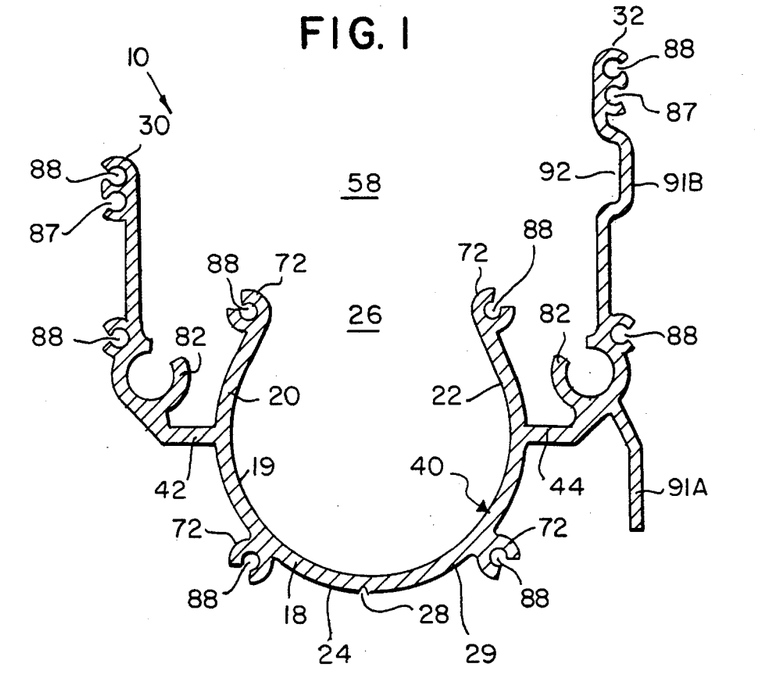
FIG. 1 is a cross sectional view of a reaction canister body part with an integrally shaped inflator holder, in accordance with one embodiment of the invention.
Figure 2:
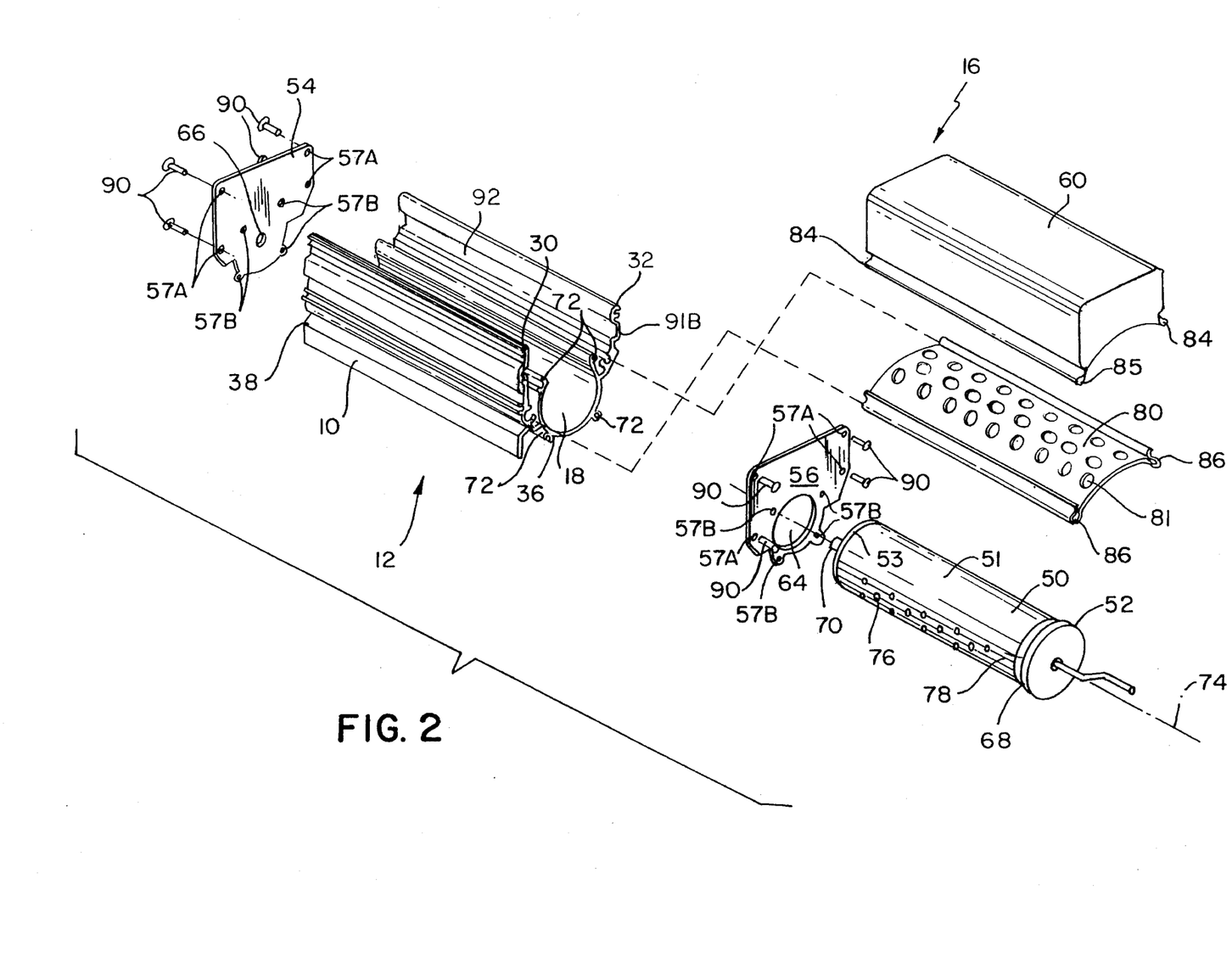
FIG. 2 is an exploded perspective view of an air bag module subassembly in general accordance with one embodiment of the invention, having a reaction canister body part with an integrally shaped inflator holder, as shown in FIG. 1.

Referring to the drawings and initially referring particularly to FIGS. 1–2, there is illustrated an extruded reaction canister structure body part, generally designated by the reference numeral 10, which includes the general form of a long, narrow, open receptacle or trough. The reaction canister body part 10 is shown separately in FIG. 1 and as a part of a reaction canister assembly 12 of an inflatable restraint system module assembly 16, in FIG. 2. It is to be understood that in the practice of the invention, such module assemblies are commonly housed in or secured to any appropriate cooperating portion of a corresponding vehicle. In the case of a passenger side module installation, such an assembly is normally housed in the instrument panel/dash board (not shown) of the vehicle opposite the passenger seat. In the case of a driver side module installation, such an assembly is typically housed in or secured to the steering wheel. Such an extruded reaction canister body part can be formed as a continuous extrusion of aluminum, for example.

The reaction canister body part 10 includes an integrally shaped inflator holder 18 formed by a wall 19. The inflator holder 18 is of partial, generally circular cross section extending less than 360° wherein in an inflator-containing, inflatable passive restraint system, an inflator chamber tube is held in coaxial relation, and includes, as a part of an integral structure, first and second side wall portions, 20 and 22, respectively, joined together by way of a concave base portion 24. The inflator holder 18 thereby defines a gap opening, generally designated by the reference numeral 26. In general, as a result of practical limitations in extrusion fabrication such as those involving die tongue ratio and operational limitations such as the body part have an opening sized to permit proper gas flow therethrough while permitting proper spacing and locating of attachment preparations as well as having an inflator holder functioning as a retaining device for an inflator, such an extruded body part having an inflator holder of partial circular cross section will generally include a gap opening of an arc angle of at least about 45°, preferably at least about 90°, and typically no more than about 180°, preferably no more than about 135°.

As perhaps best seen by reference to FIG. 1, the wall 19 is pre-weakened, such as by reducing the thickness of the wall, for example, such as along a preformed linear (i.e., in the form of a straight line) tear seam 28, formed along the outer surface 29 of the wall 19. The function of such a tear seam stress inducing feature which will be described later in greater detail with specific reference to the embodiment of the invention illustrated in FIGS. 3–5.

The reaction canister body part 10 also includes first and second opposite side walls or panels, e.g., a top side wall and a bottom side wall, 30 and 32, respectively, and first and second opposite ends, 36 and 38, respectively (see FIG. 1). The side walls are generally spaced apart and joined together by way of a body part bridging portion 40, e.g., that portion of the reaction canister body part 10 extending between and joining the respective side walls 30 and 32. For example, the side walls 30 and 32 are preferably formed directly continuous with the integrally shaped inflator holder 18 or, as shown, continuously formed therewith via side wall connecting portions 42 and 44, respectively.

In the illustrated embodiment, the side walls 30 and 32 are shown as being of different lengths, with the bottom side wall 32 being of a longer length than the top side wall 30. In general, it has been found that reaction canisters so shaped can more conveniently be incorporated within the dash board/instrument panel of automotive vehicles. It is to be understood, however, that the invention is not limited to use in conjunction with reaction canister side walls of such relative length. That is, the invention can similarly be used in conjunction with reaction canister body parts having side walls of similar lengths as well as reaction canister body parts wherein the length of the top side wall exceeds that of the bottom side wall.

As shown, particularly in FIG. 2, the inflator holder 18 is generally sized, shaped, and adapted for the placement therein of an inflatable restraint system inflator 50 including an inflator chamber portion 51, with the inflator 50 having first and second end portions, 52 and 53, respectively.

To that end and as identified above, the inflator holder will preferably have a generally circular cross section as inflator devices most commonly used in such applications also have an outer cross sectional shape that is generally circular, albeit the inflator holder will typically have a circular cross section of larger diameter than that of the inflator device, permitting the inflator device to be positioned and held coaxially therein.

Such an inflator holder also serves as a retaining device for the inflator. That is, the inflator holder side walls 20 and 22 can be appropriately sized and shaped to cooperate with the base portion 24, as may be desired, to result in gap opening 26 being of such a width as to normally not permit an inflator held therewithin to escape from such hold, even when used in conjunction with a directional inflator.

As identified above, the reaction canister body part side walls 30 and 32, respectively, are generally spaced apart and in conjunction with the inflator 50 and a first end plate 54 and a second end plate 56 define an air bag retaining cavity, generally designated by the reference numeral 58. An air bag 60, such as folded in a conventional manner, is housed within the cavity 58. In one preferred embodiment and as shown in the figures, the spaced apart side walls 30 and 32 are generally parallel to each other, ensuring a more uniformly shaped air bag retaining cavity and thereby reducing the possibility of the air bag housed within the cavity therebetween undesirably getting caught or snagged such as by a protruding surface or edge of the reaction canister body part. It is to be understood, however, that the side walls can be otherwise angularly positioned relative to one another as may be desired in specific applications, such as to permit the accommodation of the reaction canister into a specifically shaped dash board or instrument panel opening.

The inflator 50 has an elongated cylindrical configuration and is held in the inflator holder 18, in concentric relation therewith, between the end plates 54 and 56. As will be described in more detail below, each of the end plates, 54 and 56, respectively, includes a number of fastener holes 57. (Fastener holes 57A can be used for attachment of the end plates to the body part 10 and fastener holes 57B can be used, if desired, for the attachment of an inflator device into the assembly.)

In order to allow the inflator to be inserted into the inflator holder as a last operation in the assembly process, a circular opening 64 is provided in the second end plate 56 and a smaller keyed slot opening 66 is provided in the first end plate 54. Also, as shown, a flange 68 is provided on the first end 52 of the inflator 50 and a threaded keyed stud 70, such as is common to such inflator devices, is provided on the second end 53 of the inflator 50. The size of the opening 64 is such as to allow the second end 53 of the inflator 50 to be inserted therethrough with the flange 68 at the first end 52 mating with the second end plate 56 about the opening 64. If desired, such as in order to further secure an inflator within the assembly, for example, the inflator device can be provided with fastener holes (not shown), such as in the base flange of the inflator and such as will align with the fastener holes 57B, such as in either or both of the end plates 54 and 56, and the end base attachment preparations 72 in the respective end 36 or 38 of the reaction canister body part 10. Thus through the use of a selected fastener, such as a screw, bolt, rivet or the like, in cooperation with the fastener holes in the end plate and in the inflator base flange and the end base attachment preparations in the reaction canister body part, the joinder of the inflator within the assembly can be further or, if desired, alternatively secured.

Similarly, the size of the keyed opening 66 is such as snugly receive the stud 70. The arrangement is such that the relative angular position of the inflator 50 about the longitudinal axis 74 thereof and within the reaction canister body part 10 is determined by the keyed opening 66 and the keyed inflator stud 70. A nut (not shown) can be placed on the stud 70 so as to serve to hold the end plates 54 and 56 against first and second ends, 52 and 53, respectively, of the inflator 50.

The inflator 50 also includes gas exit vents or ports 76 along at least one side, denominated side 78, and whereby gas is discharged from the inflation chamber 51 and can be directed for inflation of the air bag 60, as can more easily be seen by reference to FIG. 2.

To assist in producing or forming a more uniform or orderly distribution of gas into the inflating air bag and whereby a more uniformly and/or orderly deployment of the inflating air bag can be effected, one or more flow directing devices can be incorporated within the reaction canister assembly. For example, such flow directing devices can take the shape or form of baffles or gas port passages of particular size, shape and/or arrangement.

In one preferred embodiment of the invention, such flow directing devices can take the form of and/or include an air bag retainer/diffuser device 80, as shown in FIG. 2. The air bag retainer/diffuser device 80 includes a plurality of openings 81 therein to permit the passage of gas therethrough. The openings 81 are located and sized so as to provide a desired distribution of gas into the air bag 60.

A preferred such device or system for use in the practice of the invention is a retainer device/system such as described in commonly assigned U.S. patent application Ser. No. 07/993,280, filed on Dec. 18, 1992, and which device/ system incorporates diffuser face member features such as described in commonly assigned U.S. patent application Ser. No. 07/993,277, also filed on Dec. 18, 1992, the text of which applications are fully incorporated herein by reference. As disclosed therein, the size, geometry, and arrangement of the gas passage openings can be appropriately designed to satisfy specific application needs and the invention is not necessarily limited to use with a diffuser with gas passage openings of any specific configuration. Further, as disclosed therein, such a diffuser device/system, in addition to fostering desired gas diffusion can also assist in: 1) facilitating module assembly; 2) maintaining proper air bag retention within the assembly, and 3) maintaining desired separation of the hot inflator surfaces from both the surface of the air bag as well as from contact by the vehicle occupants. For example, relative to the retaining of an air bag within the assembly, such a means of retaining an air bag can advantageously avoid or minimize the need for conventional fastener devices such as screws or rivets, for example.

In addition, a diffuser device/system, such as the air bag retainer/diffuser 80, can serve to facilitate control of bell mouthing of the reaction canister, thereby assisting in maintaining the integrity of the reaction canister.

To that end, the reaction canister body part 10 includes, as a part of the side walls 30 and 32, integrally formed attachment sleeves 82. As described in the above-referenced U.S. patent application Ser. No. 07/993,280, such attachment sleeves allow for the fastenerless attachment of an air bag within an inflatable safety system. It is to be understood, however, that the practice of the subject invention in its broader aspects is not limited to use with such attachment sleeves and that, if desired, an alternative form of air bag retention/diffuser attachment preparation can be used, such as those that include fastener devices such as screws or rivets, such as described in the above-referenced U.S. patent application Ser. No. 07/993,277. Further, it is to be understood that, if desired, the invention can be practiced via the utilization of a cushion retainer, such as disclosed in the above-referenced U.S. patent application Ser. No. 07/993,280, which device serves to retain an air bag (e.g., a cushion) within the assembly while minimizing or, preferably, avoiding the use of fasteners such as screws or rivets, does not necessarily incorporate diffuser features with such retainer device. Also, it is to be understood that, if desired, the invention can be practiced both without the utilization of the referenced diffuser features and while making use of common forms of air bag attachment, such as the use of fasteners such as screws and/or rivets, for example.

As shown in FIG. 2, the air bag 60 has a thickened peripheral edge 84. Such thickening of an air bag is described in the above-referenced U.S. patent applications i.e., Ser. No. 07/993,277 and Ser. No. 07/993,280, and can take the form, as shown, of a hemmed loop 85 of air bag material at the gas inlet opening edge of the air bag 60 and into which loop, a selected bead material (not shown) is placed to better ensure positive engagement of the air bag 60 into the assembly 16. The air bag retainer/diffuser device 80 includes a channel 86 thereabout wherein the thickened peripheral edge 84 of the air bag 60 can be secured to form an air bag/diffuser subassembly for joinder to a reaction canister body part, as shown and as described in detail in the above-referenced patent applications.

As disclosed in the above-referenced patent application, U.S. Ser. No. 07/993,277, the bead material can suitably be fabricated from a wide range of materials such as metal or, preferably, plastic, especially an extruded thermoplastic and can take various shapes or forms to meet the needs of particular applications.

Again referring to FIG. 1, the body part 10 further includes protective cover retaining preparations 87, shown as taking the form of slots about the outer extremity of each of the side walls 30 and 32, respectively. A protective cover (not shown) such as of fiber reinforced paper, for example, can be included as a part of the air bag module subassembly 16 in the form of a wrap joined to the reaction canister body part 10 about the air bag 60 within the air bag retaining cavity 58 of the subassembly 16. Such a protective cover can be secured to the reaction canister body part 10 such as with an elastic band or other selected bead material (not shown) placed about the outer edge of the protective cover, with the bead material secured within such a protective cover retainer slot preparation 87. Such a protective cover serves to help protect the air bag from damage such as by accidental or other undesired contact such as by or with other elements of the inflatable restraint system as well as extraneous elements in the environment to which the air bag can be exposed. Also, such a protective cover serves to desirably keep debris out of the reaction canister assembly.

In practice, such a protective cover is preferably fabricated of a tough, wear and normally tear resistant material which can be preferably broken or ruptured at predetermined or selected sites such as through the aid of perforations therein. For example, such a protective cover can be fabricated of fiber reinforced paper, such as that sold by E. I. Du Pont de Nemours Co. under the name TYVEK. It is to be understood, however, that other appropriate materials such as having such described or preferred properties or characteristics can also be used.

Also, the reaction canister body part 10 includes a plurality of end closure attachment preparations 88, including the above-identified end base attachment preparations. Such attachment preparations can take the form of a hollow or, as the body part is preferably prepared by extrusion fabrication, such attachment preparations can preferably take the form of a groove or what is commonly referred to in the extrusion field as a "screw slot." It is to be understood, however, that the attachment preparations and the form of attachment are not limited to the use of screw fasteners.

As shown, such attachment preparations 88 are preferably spaced about the periphery of the body part 10, both along the side walls 30 and 32, and about the inflator holder 18 so as to ensure secure attachment of end closures (e.g., the end plates 54 and 56) to the reaction canister body part 10. In general, the end closures retain the cross sectional shape of the reaction canister body part 10.

In the air bag module assembly of the invention, the end closures can take the form of end plates. Fasteners 90, such as swaging screw fasteners, can be used in securing such end closures in the assembly.

The reaction canister body part 10 can also include one or more mounting portions, generally designated by the reference numeral 91. Such mounting portions can be either of an external type, i.e., for mounting of the reaction canister body part within a selected vehicle, or an internal or semi-internal type, i.e., for mounting of items to or within the reaction canister body part. As is to be understood and as will be apparent to those skilled in the art, an external mounting portion, such as the mounting bracket 91A, can be appropriately positioned, orientated, shaped, and sized as desired to effected the desired result. Further, an internal or semi-internal type mounting portion, such as the mounting bracket 91B, can be extruded as a segment of a side wall, e.g., the side wall 32. Such a mounting bracket 91B can, for example, be used in the formation of a cavity or recess 92 useful in distancing and shielding the air bag from fastening nuts or other elements used in the reaction canister assembly.

Figure 3:
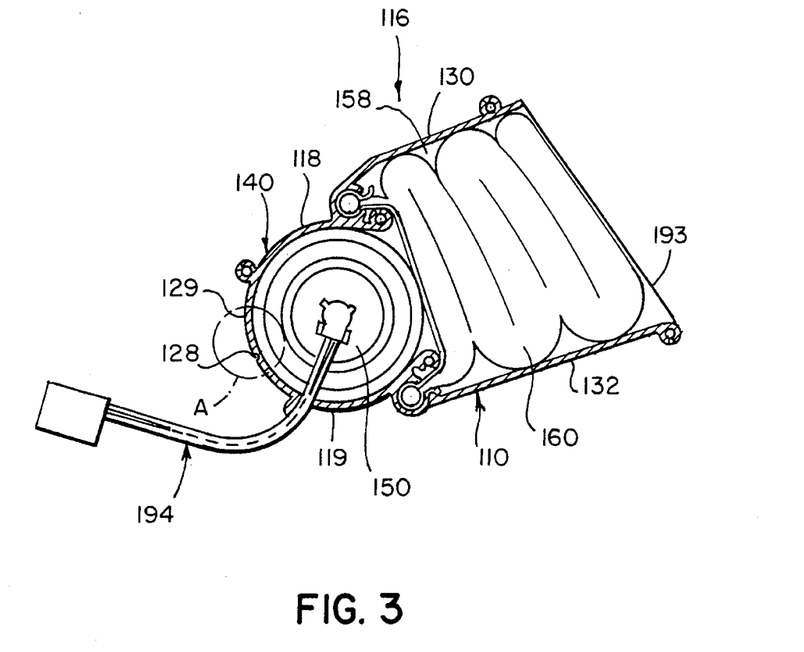
FIG. 3 is a cross sectional side view of an inflatable restraint system module assembly having a reaction canister structure body part in accordance with one embodiment of the invention.
Figure 4:
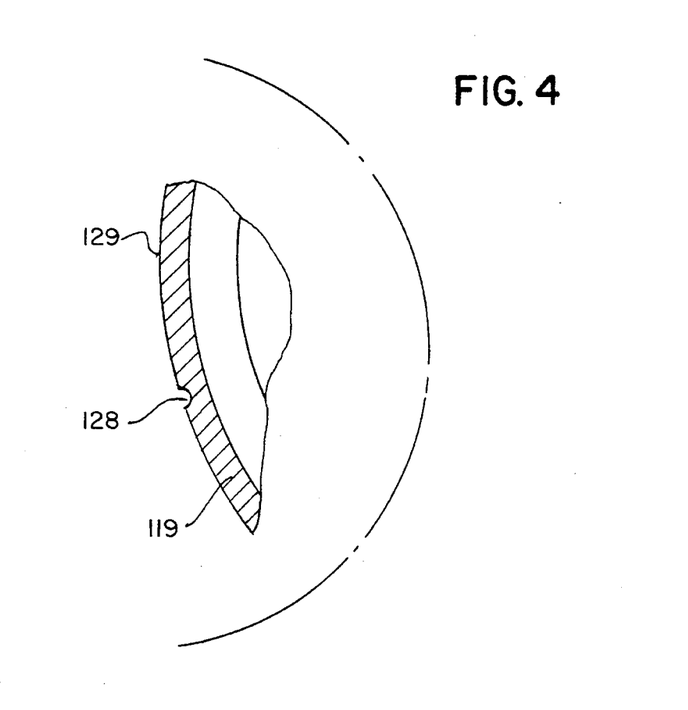
FIG. 4 is an enlargement of section A of FIG. 3.
Figure 5:
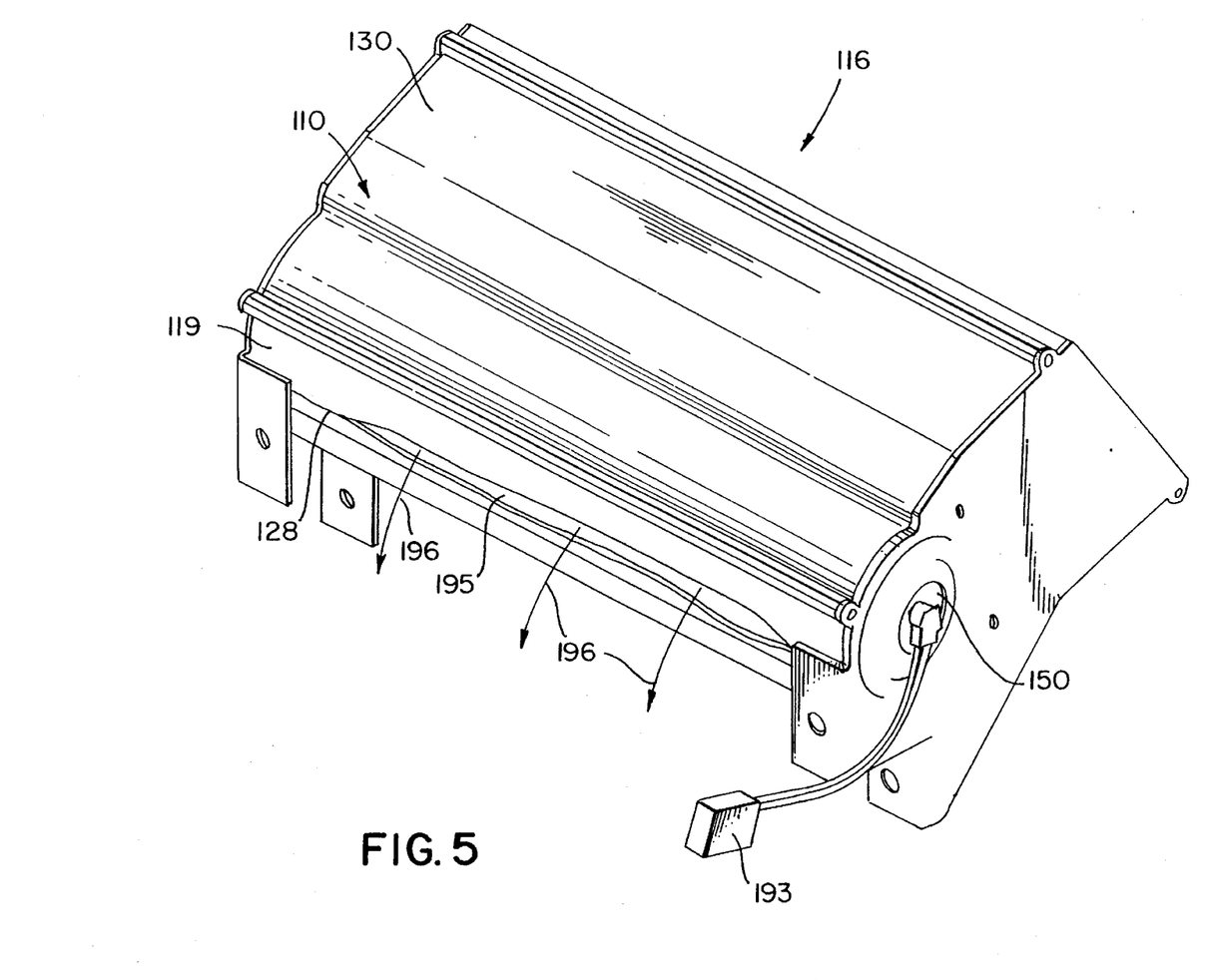
FIG. 5 is a rear perspective view of the inflatable restraint system module assembly shown in FIG. 3 and wherein the tear seam formed in the body part has torn to vent gas therefrom.

FIGS. 3–5 illustrate an inflatable restraint system module assembly 116 having a simplified reaction canister structure body part 110, generally similar to the reaction canister structure body part 10 shown in FIGS. 1–2.

The reaction canister structure body part 110 includes a first and a second side wall, 130 and 132, respectively, spaced apart forming an air bag retaining cavity 158 wherein an air bag 160 is normally housed in a folded condition. The side walls 130 and 132 are joined together by way of a body part bridging portion 140, forming an integrally shaped inflator holder 118 wherein is housed an inflator 150. The bridging portion 140 of the reaction canister part 110 formed by the wall 119 is pre-weakened, such as by reducing the thickness of the wall, for example, such as along a preformed tear seam 128, formed along the outer surface 129 of the wall 119.

The illustrated assembly 116 also includes a protective cover 192, such as described above.

Also shown is an inflator actuation assembly 194 whereby the inflator 150 can properly be actuated. As such actuation assemblies are known in the art and form no part of the invention, such actuation assemblies will not be further described herein.

FIG. 5 illustrates the inflatable restraint system module assembly 116 wherein the inflator 150 has released a quantity of energy within the assembly 116. Such energy release creates a build-up of pressure within assembly 116, specifically against the wall 119 of the inflator holder 118. The inclusion of the tear seam 128, however, provides a desired failure mode for the reaction canister body part 110 whereby, as a result of such pressure build-up, the wall 119 ruptures 195 when a predetermined maximum pressure thereagainst has been reached. In normal operation, wherein a reaction canister pressure build-up of 100 psi is in excess of the pressure build-ups normally observed, it is preferred that a pressure build-up of no more than about 100 psi occurs against the tear seam prior to the initiation of the tearing of said tear seam and the venting of pressure from said body part.

As shown in FIG. 5, such rupture permits the safe venting of pressure, e.g., pressurized gas signified by the arrows 196, from the assembly.

It will be appreciated that the location of the stress inducing feature, e.g., the tear seam, can be optimized for the in vehicle position of the air bag module. For example, the stress inducing feature can be located such that the gas is vented therefrom in a direction towards the vehicle fire wall and away from the vehicle interior. In the illustrated embodiment, the vented gas is directed rearward from the assembly, i.e., in a direction opposite from that of the vehicle occupant, who in the normal operation of the assembly, would be served by the air bag upon inflation thereof.

Thus, the inclusion of such a tear seam can be used to control the burst pressure of the reaction canister assembly as well as the location and mode of such desired and designed safety burst failure. The inclusion of such a tear seam results in a controlled structural failure of the reaction canister structure which allows for a clean separation of the reaction canister along the tear seam. As a result, burst failures that could result in fragmentation of the reaction canister housing structure are avoided.

As the body part of the invention is preferably prepared by extrusion fabrication, such a tear seam can preferably be formed in the part during the extrusion fabrication thereof, thereby avoiding the need for any additional processing operations. It is to be understood, however, that such a tear seam can, if desired, be formed in the part through post extrusion fabrication machining, such as by milling.

It is also to be appreciated that one skilled in the art and guided by the teachings herein provided can select the size and particular shape of the tear seam to provide the desired controlled pressure relief of an inflatable restraint reaction canister. Further, in extruded reaction canister body parts, tear seams in the form of a U-shaped groove rather than a V-shaped groove will typically be preferred, at least in part due to the relative ease of formation.

Figure 6:
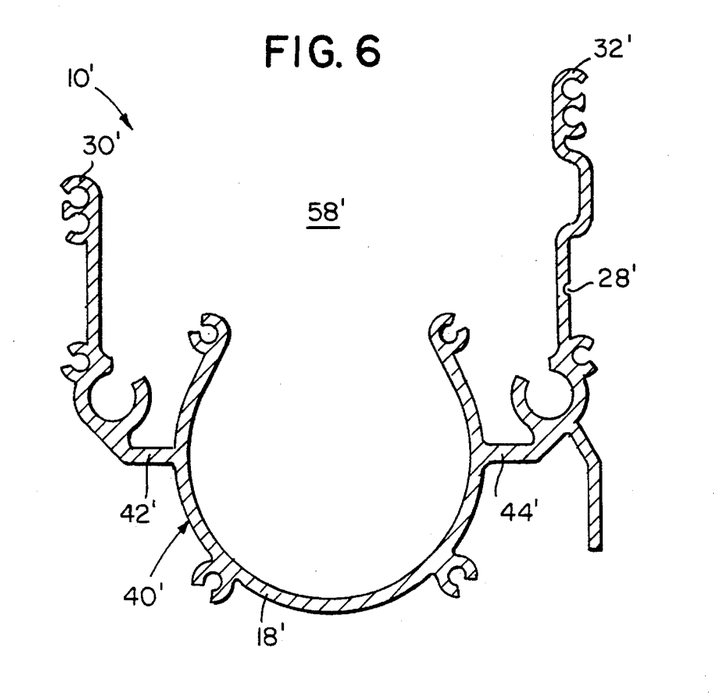
FIG. 6 is a cross sectional view of an alternative embodiment of the reaction canister body part of the invention.

FIG. 6 illustrates a reaction canister body part 10' in accordance with an alternative embodiment of the invention.

As with the reaction canister body part 10 of FIGS. 1 and 2, the reaction canister body part 10' includes an integrally shaped inflator holder 18' of partial, generally circular cross section, with first and second opposite side walls or panels, e.g., a top side wall and a bottom side wall, 30' and 32', respectively, and forms an air bag retaining cavity 58' therebetween. The side walls 30' and 32' are joined together by means of a bridging portion 40' composed of the inflator holder 18' and the corresponding connecting portions 42' and 44', respectively.

The inflator holder 18' of reaction canister body part 10', similar to the inflator holder 18 of reaction canister body part 10, is of partial, generally circular cross section. The inflator holder 18' differs, however, in that the tear seam 28' rather than being located at along a portion of the body part bridging between the side walls 30' and 32' respectively, is located along one of the side walls. In the illustrated embodiment, the tear seam is shown along the side wall 32'. It is to be understood, however, that the invention is not limited to the inclusion of such a tear seam in one particular side wall and, dependent on the particular application, the particular placement of such a tear seam in one or more of such side walls or alternatively the bridging portion or the bridging portion and one or more of the side walls will be dependent on the particular application in which the assembly is to be utilized. Further, for a particular installation, the location, placement, and orientation of such a tear seam will typically be dependent, at least in part, on the specific instrument panel or dash board geometry, configuration and the relationship thereof with the vehicle interior and fire wall, for example.

Figure 7:
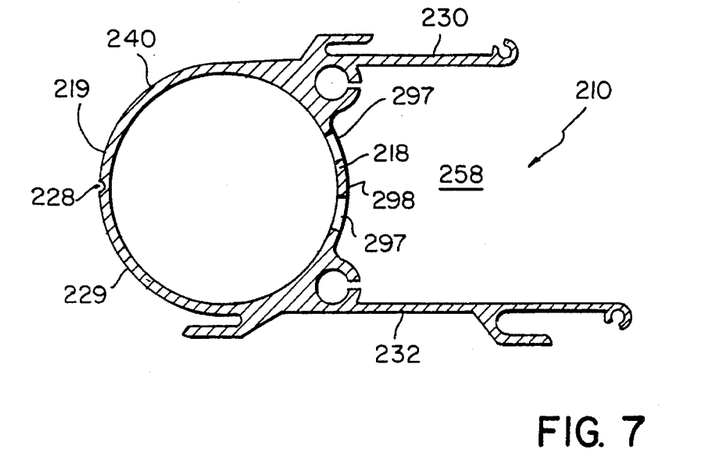
FIG. 7 is a simplified cross sectional view of a reaction canister body part in accordance with another embodiment of the invention.

FIG. 7 illustrates a simplified reaction canister body part 210 in accordance with another embodiment of the invention. As with the reaction canister body part 10 of FIGS. 1 and 2, the reaction canister body part 210 includes first and second opposite side walls or panels, e.g., a top side wall and a bottom side wall, 230 and 232, respectively, and forms an air bag retaining cavity 258 therebetween. The opposing side walls 230 and 232 are also generally spaced apart and joined together by way of a body part bridging portion 240. The bridging portion 240, however, rather than forming an inflator holder having a generally circular cross section extending less than 360° wherein in an inflator-containing, inflatable passive restraint system, an inflator chamber tube is held in coaxial relation, includes a continuous circumference tubular diffuser 218 wherein an inflator chamber tube is held in coaxial relation. Such a continuous circumference diffuser is specifically described in commonly assigned and herein fully incorporated patent application, U.S. Ser. No. 07/840,238, filed on Feb. 24, 1992.

It will be appreciated that such a continuous circumference diffuser has particular utility when used in combination with a thrust neutral inflator.

Spaced inflating gas exit ports or slots 297 are provided in the wall portion 298 of the diffuser tube 218 that faces the adjoining air bag (not shown).

In the continuous circumference diffuser 218 of FIG. 7, however, the wall 219 is pre-weakened, such as by reducing the thickness of the wall, for example, such as along a preformed tear seam 228, formed along the outer surface 229 of the wall 219. The function of such a tear seam 228 is similar to that described above, e.g., provide a desired failure mode for the reaction canister body part whereby, as a result of such pressure build-up, the wall 219 ruptures when a predetermined maximum pressure thereagainst has been reached thereby permitting the safe venting of pressure, e.g., pressurized gas, from an inflatable restraint system module assembly. Thus, the inclusion of such a tear seam can be used to control the burst pressure of the reaction canister assembly as well as the location and mode of such desired and designed safety burst failure.

Figure 8:
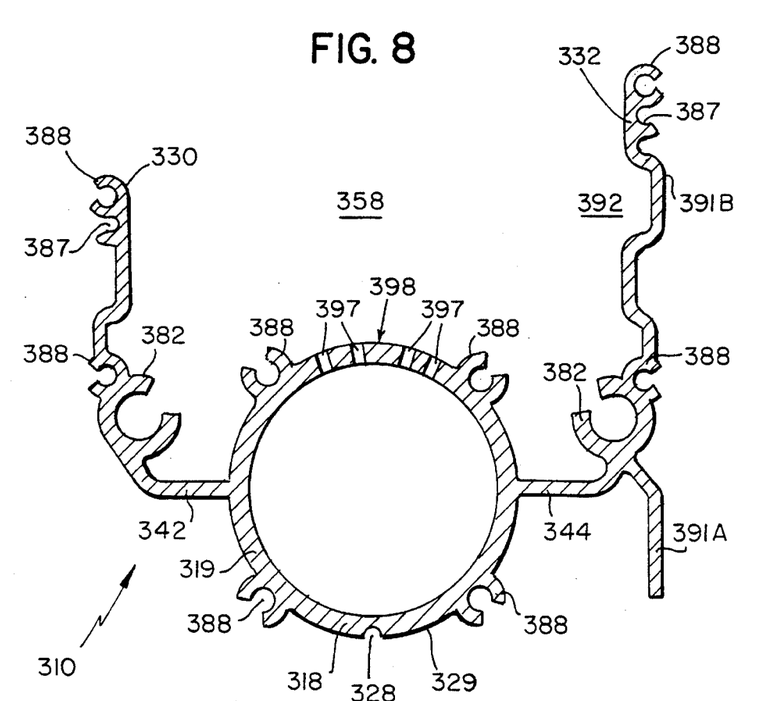
FIG. 8 is a simplified cross sectional view of yet another alternative embodiment of a reaction canister body part of the invention.

FIG. 8 illustrates a simplified reaction canister body part 310 in accordance with another embodiment of the invention. As with the reaction canister body part 10 of FIGS. 1 and 2, the reaction canister body part 310 includes first and second opposite side walls or panels, e.g., a top side wall and a bottom side wall, 330 and 332, respectively, and forms an air bag retaining cavity 358 therebetween.

The reaction canister body part 310, similar to the above-described reaction canister body part 10, includes: air bag attachment sleeves 382, protective cover retaining preparations 387, end closure attachment preparations 388, an external mounting portion, e.g., a mounting bracket 391A, and an internal or semi-internal type mounting portion, e.g., a mounting bracket 391B, such as to form a cavity or recess 392.

The opposing side walls 330 and 332 are also generally spaced apart and joined together by way of a body part bridging portion 340, which includes side wall connecting portions 342 and 344. The bridging portion 340, however, rather than forming an inflator holder having a generally circular cross section extending less than 360° wherein in an inflator-containing, inflatable passive restraint system, an inflator chamber tube is held in coaxial relation, includes a continuous circumference tubular chamber portion 318 of an inflator.

Such an inflator chamber is specifically described in the above-identified, parent patent application, U.S. Ser. No. 08/046,692, filed on Apr. 12, 1993.

Such an inflator chamber, similar to the inflator chambers that are commonly included as a portion of inflators designed and used in air bag module assemblies, can serve to house a gas generant material, such as commonly associated with pyrotechnic inflators.

An inflator chamber in the form of a tube having a circular cross section, as shown by the inflator chamber 318, will generally be preferred as such a structure is generally best suited for use in such applications wherein the chamber must withstand such pressure operation. It is to be understood, however, that in the practice of the invention, if desired, other shapes or forms of inflator chamber can be used.

The internal components of the inflator chamber 318 and the composition and form of the gas generant material housed therein form no part of the present invention and may be any of a number of known constructions/formulations such as are commercially available. By way of example and not limitation, such internal components may comprise that disclosed in commonly assigned U.S. Pat. No. 4,890,860 granted to F. E. Schneiter on Jan. 2, 1990.

The inflator chamber 318 includes gas exit vents or ports 397 along a side 398 thereof. Such gas exit vents permit the gas generated within the inflation chamber to exit from the chamber and be directed for inflation of the adjoining air bag (not shown).

In the inflator chamber tube 318 of FIG. 8, the wall 319 is pre-weakened, such as by reducing the thickness of the wall, for example, such as along a preformed tear seam 328, formed along the outer surface 329 of the wall 319.

The tear seam, as shown, can preferably be in the form of a straight line, either along the full or partial length of the part, as with the above-described embodiments. The function of such a tear seam 328 is similar to that described above, e.g., provide a desired failure mode for the reaction canister body part whereby, as a result of such pressure build-up, the wall 319 ruptures when a predetermined maximum pressure thereagainst has been reached thereby permitting the safe venting of pressure, e.g., pressurized gas, from an inflatable restraint system module assembly. Thus, the inclusion of such a tear seam can be used to control the burst pressure of the reaction canister assembly as well as the location and mode of such desired and designed safety burst failure.

In practice, such a chamber portion has an operating pressure in the range of about 1500 psi, desirably is capable of withstanding a pressure of about 4500 psi and has gas exit vents along at least one side thereof.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. In an inflatable restraint system reaction canister, the improvement comprising:

a conventionally extruded one-piece canister structure body part wherefrom an air bag is deployable in a first direction, said body part having first and second opposite side walls spaced apart to form an air bag retaining cavity and a bridging portion joining said first and second opposite side walls wherein at least one of said bridging portion, first side wall and second side wall comprises a tear seam adapted to tear under the influence of a build-up of pressure thereagainst to provide venting of such pressure in a direction away from the first direction.

2. The improvement of claim 1 wherein a pressure build-up of no more than about 100 psi against said tear seam results in tearing of said tear seam and venting of pressure from said body part.

3. The improvement of claim 1 wherein at least a first said tear seam is incorporated in said body part during the extrusion fabrication thereof.

4. The improvement of claim 1 wherein at least a first said tear seam is incorporated in said body part by post extrusion machining.

5. The improvement of claim 1 wherein at least a first said tear seam is in said bridging portion.

6. The improvement of claim 1 wherein at least a first said tear seam is in one of said first and second side walls.

7. The improvement of claim 1 wherein said body part is a continuous extrusion of aluminum.

8. The improvement of claim 1 wherein said bridging portion comprises an inflator holder having a generally circular cross section extending less than 360° wherein in an inflator-containing, inflatable passive restraint system, an inflator chamber tube is held in coaxial relation.

9. The improvement of claim 1 wherein said bridging portion comprises a continuous circumference tubular diffuser chamber wherein, in an inflator-containing, inflatable passive restraint system, an inflator chamber tube is held in coaxial relation.

10. The improvement of claim 1 wherein said bridging portion comprises a continuous circumference tubular chamber portion of an inflator, said chamber portion capable of withstanding a pressure of about 4500 psi and having gas exit vents along at least one side thereof.

11. An inflatable restraint system module assembly comprising an air bag inflator housed within an inflatable restraint system reaction canister comprising the improvement of claim 1 wherein upon exposure of the assembly to extreme heat conditions the inflator produces a build-up of pressure against said tear seam with said tear seam tearing to provide venting of such pressure from within the reaction canister.

12. In an inflatable restraint system reaction canister, the improvement comprising:
 a conventionally extruded one-piece canister structure body part wherefrom an air bag is deployable in a first direction, said body part having first and second opposite side walls and a bridging portion joining said first and second opposite side walls wherein said bridging portion comprises a linear tear seam incorporated in said body part during the extrusion fabrication thereof, said tear seam adapted to tear under the influence of a build-up of pressure thereagainst of no more than about 100 psi to provide venting of such pressure in a direction away from the first direction.

13. The improvement of claim 12 wherein said body part is a continuous extrusion of aluminum.

14. The improvement of claim 12 wherein said bridging portion comprises an inflator holder having a generally circular cross section extending less than 360° wherein in an inflator-containing, inflatable passive restraint system, an inflator chamber tube is held in coaxial relation.

15. The improvement of claim 12 wherein said bridging portion comprises a continuous circumference tubular diffuser chamber wherein, in an inflator-containing, inflatable passive restraint system, an inflator chamber tube is held in coaxial relation.

16. The improvement of claim 11 wherein said bridging portion comprises a continuous circumference tubular chamber portion of an inflator, said chamber portion capable of withstanding a pressure of about 4500 psi and having gas exit vents along at least one side thereof.

17. An inflatable restraint system module assembly comprising an air bag inflator housed within an inflatable restraint system reaction canister comprising the improvement of claim 12 wherein upon exposure of the assembly to extreme heat conditions the inflator produces a build-up of pressure against said tear seam with said tear seam tearing to provide venting of such pressure from within the reaction canister.

18. The improvement of claim 12 wherein the first and second opposite side walls of said body part are spaced apart to form an air bag retaining cavity.

* * * * *

UNITED STATES PATENT AND TRADEMARK OFFICE
CERTIFICATE OF CORRECTION

PATENT NO. : 5,566,975
DATED : October 22, 1996
INVENTOR(S) : Mark W. Stull et al.

It is certified that error appears in the above-indentified patent and that said Letters Patent is hereby corrected as shown below:

At title page, under Inventors, "David J. Green, Brigham," should be
--David J. Green, Brigham City,--.

At title page, under References Cited, U.S. Patent Documents, "5,128,674" should be
--5,129,674

Signed and Sealed this

Fifth Day of August, 1997

Attest:

BRUCE LEHMAN

Attesting Officer

Commissioner of Patents and Trademarks